US012570523B2

(12) United States Patent
Montero Garcia et al.

(10) Patent No.:  US 12,570,523 B2
(45) Date of Patent:  Mar. 10, 2026

(54) PROCESS FOR PRODUCING A HYDROGEN-RICH GAS STREAM FROM ALUMINIUM WASTE

(71) Applicant: Befesa Aluminio, S.L., Bizkaia (ES)

(72) Inventors: Jessica Montero Garcia, Bizkaia (ES); Jorge Romero Polanco, Bizkaia (ES); Carlos Ruiz De Veye, Bizkaia (ES)

(73) Assignee: BEFESA ALUMINIO, S.L., Erandio (ES)

( * ) Notice: Subject to any disclaimer, the term of this patent is extended or adjusted under 35 U.S.C. 154(b) by 502 days.

(21) Appl. No.: 18/326,382

(22) Filed: May 31, 2023

(65) Prior Publication Data

US 2023/0382726 A1      Nov. 30, 2023

(30) Foreign Application Priority Data

May 31, 2022      (EP) .................................... 22382522

(51) Int. Cl.
  *C01B 3/06*          (2006.01)
  *C01B 3/061*         (2026.01)
  *C01B 3/08*          (2006.01)
(52) U.S. Cl.
  CPC ................ C01B 3/061 (2013.01); C01B 3/08 (2013.01)
(58) Field of Classification Search
  None
  See application file for complete search history.

(56) References Cited

U.S. PATENT DOCUMENTS

| | | | |
|---|---|---|---|
| 6,440,385 B1 | 8/2002 | Chaklader | |
| 6,582,676 B2 * | 6/2003 | Chaklader | C01B 3/08 |
| | | | 423/657 |
| 6,899,862 B2 * | 5/2005 | Baldwin | B01J 10/007 |
| | | | 423/657 |
| 11,952,273 B2 * | 4/2024 | Cohly | B01J 19/127 |
| 2005/0232837 A1 * | 10/2005 | Troczynski | C01B 3/08 |
| | | | 502/251 |
| 2007/0020174 A1 | 1/2007 | Xu et al. | |
| 2010/0173225 A1 * | 7/2010 | Rosenband | C01B 3/08 |
| | | | 123/3 |
| 2019/0039888 A1 | 2/2019 | Ho | |

FOREIGN PATENT DOCUMENTS

WO      2021202195 A1    10/2021

OTHER PUBLICATIONS

"A Basic Guide to Particle Characterization", Malvern Instruments Worldwide—White Paper, pp. 1-26, 2012, XP055089322.
European Search Report corresponding to EP22382522, dated Oct. 21, 2022, (2 pages).

* cited by examiner

*Primary Examiner* — John J Figueroa
(74) *Attorney, Agent, or Firm* — LUCAS & MERCANTI, LLP

(57)      ABSTRACT
A process for the obtention of a hydrogen-rich gas stream from aluminium waste by obtaining a process water resulting from contacting aluminium salt slag with tap water, adding the process water of the previous step to an aluminium waste in a solution, and the hydrolysis of that solution to obtain the gas stream. The process is capable to obtain a yield of reaction close to 100% in higher reaction times.

8 Claims, 3 Drawing Sheets

PROCESS FOR PRODUCING A HYDROGEN-RICH GAS STREAM FROM ALUMINIUM WASTE

CROSS-REFERENCE TO RELATED APPLICATIONS

This application claims the benefit of priority from EP application No. 22382522.5 filed May 31, 2022, the contents of which is incorporated herein by reference.

FIELD OF THE INVENTION

The sector of the present invention is the chemical industry, specifically the production of a stream rich in hydrogen from an aluminium waste.

BACKGROUND OF THE INVENTION

The production of aluminium from alumina is widely known from the Hall and Héroult process of 1886. This primary process is energy-intensive, making the difference between primary production from natural minerals and secondary production from waste.

The aluminium industry, both primary and secondary, generates different wastes, as shown in Table 1.

TABLE 1

Waste from the aluminium industry and its origin

| Type of waste | Origin |
|---|---|
| Red mud | Generation of alumina from Bauxite |
| Spent pot linings (SPLs) | Dismantling of electrolysis cells |
| White dross | Primary melting process |
| Black dross | Secondary melting process |
| Grinding filter powders | Aluminium dross pre-processed |
| Aluminium dross preprocessing | Fumes from melting furnaces |
| Skimming | Salt-free melting furnaces |
| Salt slag | Fusion in a rotary furnace with salts |

The amount of the resulting material depends on the type and quantity of the starting materials, the operating conditions and the type of technology that is used. Each one has its own physical and chemical features pending on the contained amount and type of impurities.

In particular, the dross can be considered in general terms a mixture of metal in elemental form and non-metallic materials (flux salts and oxides) formed during the melting of aluminium when contacting surface air. This dross can be divided into different types:

Dross produced mainly at primary aluminium production commonly known as primary dross, white dross, wet dross, or rich dross, containing a high metal content (more than 50% of total weight).

Dross produced at secondary aluminium production commonly known as secondary dross, black dross, dry dross, or poor dross, of low metal content (between 5 and 20% of the total weight).

One of the most standardized treatments for the treatment of dross with the aim of recovering the aluminium present in metallic form is the pyrometallurgical process using flux salts. This process favors the metal recovery but involves some aluminium losses. Melting metallic residues in rotary furnaces involves high temperature (700-800° C.) in the presence of fluxing salts (NaCl, KCl, and small additions of fluoride salts), recovering the metal, which after a subsequent refining or alloying stage leads to the production of second-melt alloys. The treatment of black or secondary dross together with these second-melt alloys generates an additional waste, known as salt slag.

These aluminium wastes can be characterized as follows in Tables 2 to 4.

TABLE 2

Typical composition according to waste

| Type of waste | % Metallic aluminium | % Aluminium oxide | % Salt flux |
|---|---|---|---|
| White dross | 15-90 | 20-85 | <5 |
| Black dross | 7-70 | 30-50 | 10-50 |
| Salt slag | 3-15 | 20-60 | 20-80 |

TABLE 3

Typical composition of salt slag

| Compound | % by weight |
|---|---|
| $Al_2O_3$ | 20-60 |
| Cl | 15.4-26.7 |
| Na | 9.9-15.1 |
| $SiO_2$ | 5-14 |
| F | 0.1-11.3 |
| K | 4.3-7.3 |
| MgO | 2.8-4.1 |
| C | 1.0-3.4 |
| CaO | 1.0-2.1 |
| $Fe_2O_3$ | 1.0-1.4 |
| $TiO_2$ | 0.3-0.5 |
| $SO_3$ | <0.3 |

TABLE 4

Typical composition of white and black dross

| Compound | White dross % by weight | Black dross % by weight |
|---|---|---|
| Al metal | 15-90 | 7-70 |
| BaO | — | — |
| Cl | <1 | <10 |
| $SiO_2$ | 1-10 | 1-20 |
| CuO | <5 | <2 |
| $K_2O$ | <1 | <5 |
| MgO | 1-5 | 1-5 |
| $Na_2O$ | <1 | <10 |
| MnO | <1 | <1 |
| CaO | 1-5 | <5 |
| $Fe_2O_3$ | <5 | <10 |
| $TiO_2$ | <5 | <1 |
| $SO_3$ | <1 | <1 |
| ZnO | <1 | <1 |

The production of hydrogen based on the hydrolysis of pure aluminium in an aqueous alkaline medium is one of the best-known processes according to the general reaction:

$$2Al+3H_2O \rightarrow 3H_2+Al_2O_3$$

However, although technically feasible, it renders economically and environmentally very unfavorable. Because of this, recent research has focused on producing hydrogen from aluminium-rich materials of secondary or residual origin.

The hydrolysis of aluminium wastes in basic media is a valid option, reporting the need for NaOH or KOH as catalysts of the reaction of aluminium with water at room temperature, according to the following reactions:

$$2Al+2NaOH+6H_2O \rightarrow 2NaAl(OH)_4+3H_2$$

$$NaAl(OH)_4 \rightarrow Al(OH)_3+NaOH$$

$$2NaOH+Al_2O_3+3H_2O \rightarrow 2NaAL(OH)_4$$

$$2Al+2KOH+6H_2O \rightarrow 2Al(OH)_3+2KOH+3H_2$$

$$2Al+2KOH+6H_2O \rightarrow 2KAl(OH)_4+3H_2$$

Metallic aluminium reacts with sodium hydroxide and water to obtain sodium aluminate along with the evolution of hydrogen. However, when the same reaction is run with alumina, the hydrogen production is not observed. Similar reactions take place in case of potassium hydroxide as well; The aluminate formed in this case, however, is relatively more stable than its sodium counterpart.

The document "Hydrolysis of aluminium dross material to achieve zero hazardous waste" (E. David & J. Kopac, Journal of hazardous materials 209-210 (2012) 501-509), compares the hydrogen produced in the hydrolysis of aluminium dross using tap water versus the hydrolysis of pure aluminium using alkaline tap water with admixed NaOH and KOH as catalysts, considering a similar sodium and potassium concentration between both experiments. It was shown that the hydrogen production reached a maximum in less than ten minutes and then dramatically stopped at a certain time of reaction when the catalysts were spent and restricted the aluminate formation. Results showed a reaction yield higher than the stoichiometric total justified by the presence of metals like nickel, zinc, or magnesium also present in the aluminium dross reacting with water.

Singh, K. K. K. discloses a procedure for obtaining a hydrogen gas stream from a fine fraction of aluminium dross using NaOH or KOH as catalysts (Singh, K. K. K. et al., "Hydrogen production using waste aluminium dross: from industrial waste to next-generation fuel", Agronomy research 17(S1) 1199-1206, 2019). Despite the authors do not provide information or data that would allow to determine the amount of sodium and potassium taking part in the reaction, the gas evolution achieves again a maximal peak with a quick drop to zero. The results show that the rate of gas production is initially less with potassium hydroxide mixtures than with sodium's and reaches a peak at the climax of each reaction at a fixed period of time.

US2007/0020174 A1 describes a process for the obtention of hydrogen reacting aluminium powder with water and different promoters selected form sodium hydroxide, potassium hydroxide, calcium hydroxide, and mixtures thereof. Example 1 of the document reports 608 std cm³ of hydrogen production when the molar ratio Na/Al is 0.02 using Na as promoter, whereas when the promoter is K at a molar ratio K/Al of 0.03 the hydrogen production is 597 std cm³. Results of the combination of NaOH and KOH are not described. The rate of the reaction increases with an increase in Group I- and II-metal hydroxides concentration, but at the same time a high concentration of metal hydroxide results in a high pH giving problems on a safe handling and disposal of the reaction product.

US20190039888A1 relates to a method for the obtention of hydrogen with waste aluminium using sodium hydroxide at a concentration of 0.25 to 0.5M. The efficiency of the process is increased along time, but it shows stagnant hydrogen production efficiency after 20 minutes. This fact can be understood after a sodium exhaustion, avoiding the formation of sodium aluminate and consequently no hydrogen generation.

The problem of the art can be formulated on how to increase the efficiency of the hydrolysis of aluminium waste for the production of hydrogen. The solution proposed by the present invention is incorporating in the reaction the process water resulting from a previous hydrolysis of aluminium salt slag with tap water.

DESCRIPTION OF THE INVENTION

The inventors have surprisingly discovered that using a process water in the hydrolysis reaction of aluminium waste changes the kinetics of the reaction for the obtention of hydrogen, avoiding saturation.

The process water is obtained contacting aluminium salt slag with tap water in a relation of about 1:2 by weight during a time of reaction of 60-150 minutes, preferably 90-120 minutes, at a room temperature.

The obtained process water is an aqueous stream of low density, in the interval of 1.1 and 1.3 g/L, with moderate alkali concentration ([K] of 5.000-60.000 ppm, preferably 15.000-30.000 ppm, even more preferably 16.000-18.500 ppm; and [Na] of 10.000-100.000 ppm, preferably 25.000-55.000 ppm, even more preferably >30.000 ppm). In addition, it has a pH between 11 and 12, and a conductivity value between 50-300 mS. A detailed analysis of offers the following general composition:

Sodium—10,000 to 100,000 ppm
Potassium—5,000 to 60,000 ppm
Aluminium—500 to 3,500 ppm
Sulphur—25 to 1,500 ppm
Silicon—35 to 150 ppm
Phosphorus—1 to 10 ppm
Iron—1 to 30 ppm
Ni, As, Ba, Mn, Co, Cr and Mg—less than 0.5 ppm each.
Calcium—1 to 5 ppm
Mercury—less than 0.002 ppm
Fluoride 100 to 500 ppm
* Fluoride analyzed by ion-selective electrode; All other elements analyzed by ICP-OES.

In the present application, "tap water" is understood as pre-treated water from underground water supply network, characterized by a pH value of 7.8±10%, a conductivity of 2.8 mS±10% and a high concentration of calcium and magnesium ions that involve a variable hardness value. Any tap water would be functional for the present invention.

The process of the present invention comprises a hydrolysis reaction of aluminium waste, salt slags or aluminium dross, for producing a hydrogen-rich gas stream, in an aqueous medium using exclusively process water as reagent, thereby avoiding the need for external heat input or additional catalytic reagents such as NaOH or KOH. For some reason still to be determined, the exhaustion of the catalysts observed in the art does not happen in the invention's process, which enables for a gas production rate close to 100%.

The inventors estimate that the process water used in the present invention should provide for functional alternative catalysts that are not present in the starting material, ensuring and enabling the reaction towards a constant development of aluminates until a full conversion of the aluminium is achieved, with no drop in gas production because of any eventual exhaustion of the catalyst.

So the present invention is a process for the obtention of a hydrogen-rich gas stream from aluminium waste comprising obtaining a process water resulting from contacting aluminium salt slag with tap water in a relation of 1:2 by weight during a time of reaction of 60-120 minutes, preferably 90-120 minutes, adding this process water to an aluminium waste of particles of 1 mm size or less, and hydrolyzing the resulting solution.

The process requires a first stage of activation of the aluminium waste by adjusting the size of the aluminium particles to a size of 1 millimeter or less. In a preferable aspect, the starting material is crushed using a rod mil for 15 minutes and then sieved using a molecular sieve with a mesh light of 1 mm.

In a further preferable aspect, the reaction for the obtention of process water is performed at room temperature.

In a further preferable aspect, the resulting solution has a pH not higher than 12.

In still another preferable aspect, the content of Na and K in the reaction solution ranges from 0.25% to 15% and/or from 0.25% to 25%, respectively, even more preferable from 4.78% to 11.40% and/or from 1.73% to 8.95%, respectively.

In another preferable aspect of the present invention, the hydrolysis step is performed at room temperature.

The process of the invention is capable to obtain a hydrogen-rich stream of 70-95% v/v from an aluminium waste without the need for external heat or the addition of further catalysts.

The rate of obtention of hydrogen enriched gas stream by the process of the present invention is close to 100% along time.

Hydrogen is the main component of the obtained gas stream, along with methane and ammonia. However, the presence of siloxanes, not previously mentioned in the prior art, as well as other silicon derivatives, phosphine and several gas sulfur compounds or gas halogenated compounds makes it interesting to further treat this gas stream. Accordingly, another preferable aspect of the present invention is the addition of a last stage of purification of the hydrogen stream.

BRIEF DESCRIPTION OF THE FIGURES

● M1, ✣ M2, ▲ M3, ✳ M4, applying to all figures.

6 distilled tap water (M1 vs. M2) in the hydrolysis of black aluminium dross in Example 4.

EXAMPLES

Example 1. Grinding the Aluminium Waste

The wastes, salt slags or dross, were crushed in a laboratory rod mill filled with 12 rods, during 15 minutes, in order to activate the reaction surface of aluminium waste particles. The resulting particles were screened using vibrational sieving device submitting the sample to three dimensional movements. This mechanism causes the particles to be evenly distributed over the entire sieving surface. Different sieves with meshes less than or equal to 1 millimeter were used to determine their weighted particle size distributions. The number of sieves and the size depends on the sample quality and on the approximate particle size distribution.

The weighted particle size distributions of salt slags and dross used in the next examples are gathered in Table 5.

TABLE 5

| Particle size (microns) | % weight Salt slag Example 3 | % weight Salt slag Example 4 | % weight White dross Example 5 | % weight Black dross Example 6 |
|---|---|---|---|---|
| 1000-710 | 9.99% | 2.44% | 7.81% | 9.38% |
| 710-500 | 11.78% | 5.01% | 11.03% | 9.79% |
| 500-300 | 16.39% | 13.44% | 15.54% | 14.69% |
| 300-200 | 9.91% | 10.61% | 9.64% | 9.28% |
| 200-100 | 16.73% | 18.78% | 18.09% | 16.71% |
| <100 | 35.19% | 49.72% | 37.88% | 40.15% |

Example 2. Performance of Process Water Versus Tap Water in the Hydrolysis Reaction The starting material was salt slag comprising 3.5% metallic aluminium determined by alkaline gas test, 11.2% (w/w) elemental sodium and 5.5% (w/w) elemental potassium analyzed by X Ray fluorescence, grinded as explained in Example 1. 100 g of starting material were mixed with:

Test M1: 200 ml distilled water.

Test M2: 200 g process water (1,803 ppm of Al, 29,445 ppm of Na and 18,103 ppm of K determined by ICP-OES).

Test M3: 200 ml of distilled water with added catalyst (a mixture of 3.7 g pure NaOH and 15.3 g of 85% purity KOH)

Test M4: 200 g process water (1,789 ppm of Al, 47,228 ppm of Na and 16,768 ppm of K determined by ICP-OES with added catalyst (a mixture of 3.7 g pure NaOH and 15.3 g of 85% purity KOH).

Figure 1:
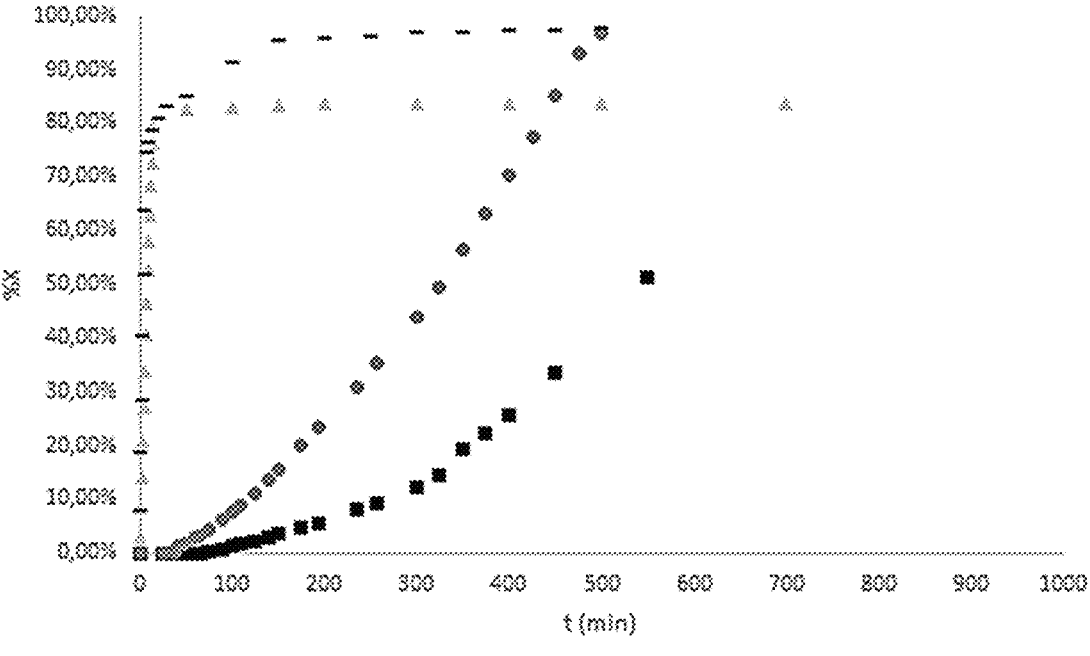
FIG. 1. Shows the variation of the generated gas stream in time of the process water of the present invention with respect to distilled water (M2 vs. M1) in the hydrolysis of salt slag, and the same process with a mixture of NaOH and KOH as catalyst (M4 vs. M3).

FIG. 1 shows the improvement of the use of a process water according to the present invention (sample M2 or M4) vs. the processes of the prior art based on water with or without catalyst (sample M3 or M1), by showing the gas conversion versus time in a hydrolysis of the salt slag.

The reaction with process water without catalyst starts after a contact time of 42 minutes, whereas, with distilled water, the contact time is much higher, 75 minutes until it begins to produce gas. Once both reactions have started, the slope of the curve for process water is much higher than for water without a catalyst, which means that the gas production flow rate is higher in the procedure of the present invention. The procedure using process water achieves 97% of gas conversion along time, whereas the reaction with non-catalyzed distilled water reveals that the hydrogen production peak has been reached close to 50% of conversion.

In any case, although not essential, the use of an additional catalyst in the hydrolysis procedure (samples M3 and M4) is beneficial. Particularly, adding a mixture of NaOH and KOH in distilled water (Sample M3) can be compared to the incorporation of said additional catalysts with process water, described in sample M4. During the first moments of the reaction, the evolution of the conversion versus time for two tests are similar, but in the catalyzed water the gas production stops suddenly before the reaction finishes (conversion close to 80%), because the amount of sodium and potassium is limited conditioning the aluminate formation and hence the hydrogen generation. However, the gas production with process water continues gradually until achieves almost the total conversion.

Example 3. Hydrolysis of Salt Slags

The starting material was salt slag comprising 3.5% metallic aluminium determined by alkaline gas test, 11.2% (w/w) elemental sodium and 5.5% (w/w) elemental potassium analyzed by X Ray fluorescence, grinded as explained in Example 1. Tables 6 and 7 show the composition of the salt slag and the water process used in the present Example.

TABLE 6

| | | | | | Salt slag | | | | | |
| F | Na2O | MgO | Al2O3 | SiO2 | P2O5 | SO3 | Cl | K2O | CaO | TiO2 |
| --- | --- | --- | --- | --- | --- | --- | --- | --- | --- | --- |
| 2.5 | 15.17 | 3.58 | 37.82 | 7.95 | 0.06 | 0.32 | 19.09 | 6.62 | 2.51 | 0.65 |
| Cr2O3 | MnO | Fe2O3 | NiO | CuO | ZnO | SrO | ZrO2 | BaO | P2O5 | LOI |
| 0.10 | 0.20 | 1.49 | 0.04 | 0.29 | 0.08 | 0.03 | 0.04 | 0.16 | | 2.42 |

TABLE 7

| | | | Process water | | | | | |
| Na | K | Al | S | Si | P | Fe | Ni | Ca |
| --- | --- | --- | --- | --- | --- | --- | --- | --- |
| 29445 | 18103 | 1803 | 25 | 37 | 3 | 5 | <0.5 | 1 |
| As | Ba | Mn | Co | Cr | Hg | Mg | | |
| <0.5 | <0.5 | <0.5 | <0.5 | <0.5 | <0.002 | <0.5 | | |

100 g of starting material were mixed with 200 g process water (1,803 ppm of Al, 29,445 ppm of Na and 18,103 ppm of K determined by ICP-OES) in test M1; Independently, 100 g of starting material were mixed with 200 ml distilled water with added catalyst (a mixture of 2.91 g pure NaOH and 12.13 g of 85% purity KOH) in test M2. The ratio of Na+K/Al in both cases resulted identical and of value 6.8. The reaction takes place in continuous stirring at room temperature.

The pressure produced by the generated hydrogen-rich gas stream pushes a water volume that is determined using weight and density. The volume of displaced water is considered the generated hydrogen-rich gas stream ($Nm^3$) and was expressed as conversion percentage. The conversion percentage is calculated as a proportion between generated hydrogen-rich gas stream ($Nm^3$) and theorical gas volume using the stoichiometric ratio.

When the hydrolysis was carried out with catalyzed distilled water (sample M2) the hydrogen production was adjacent and increased quicker for a high gas production flow rate, reaching 80% of conversion in a few minutes. However, in the next minutes the climax of the reaction was achieved, and the hydrogen production stopped.

Figure 2:
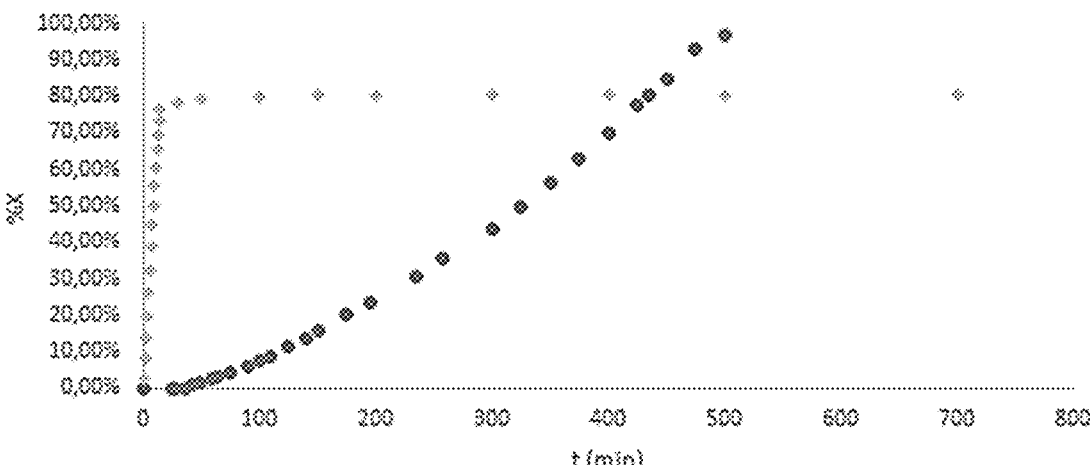
FIG. 2. Shows the variation of the generated gas stream (expressed in conversion percentage) in time of the process water of the present invention with respect to catalyzed distilled tap water (M1 vs. M2) in the hydrolysis of salt slag of Example 1.

The hydrolysis process for the M1 sample with process water started after 42 minutes, and its slope reported a slow growth until reached 80% of conversion in 435 minutes. Contrary to sample M2, the hydrogen production continued, achieving more than 95% of conversion in 500 minutes (FIG. 2).

Both experiments start at the reaction of metallic aluminium with alkaline water, whereby sodium and potassium aluminates are formed together with the evolution of hydrogen. When the reaction takes place with catalyzed water (M2), the hydrogen evolution is roughly stopped due to the high sodium and potassium concentration where no further aluminate formation and hence hydrogen generation occurs. On the contrary, the aluminates formation and hydrogen production continue until maximal performance when process water (M1) is used, acting as a catalyst for the reaction.

The hydrolysis of this salt slag with process water without additional catalysts produces 4.5 1 of hydrogen-rich gas stream. The analysis of the composition of the gas resulting from this process is shown in Table 8.

TABLE 8

| Component | Abundance range |
| --- | --- |
| Hydrogen | 78.8% v/v |
| Methane | 13.7% v/v |
| Ammonia | 5.5% v/v |
| Phosphine | 8 ppm |
| $H_2S$ | 1.3% v/v |
| Total siloxanes | 3.2 mg/$Nm^3$ |
| Total silicon | 1.11 mg/$Nm^3$ |
| PCl | 3,030.6 kCal/$Nm^3$ |

Example 4. Hydrolysis of Salt Slags

The starting material was salt slag comprising 12.1% metallic aluminium determined by alkaline gas test, 12.0% elemental sodium and 3.6% elemental potassium analyzed by X Ray fluorescence, grinded as explained in Example 1. Tables 9 and 10 show the composition of the salt slag and the water process used in the present Example.

TABLE 9

| | | | | | Salt slag | | | | | |
|---|---|---|---|---|---|---|---|---|---|---|
| F | Na2O | MgO | Al2O3 | SiO2 | P2O5 | SO3 | Cl | K2O | CaO | TiO2 |
| 0.42 | 16.25 | 2.87 | 39.94 | 7.95 | | 0.67 | 20.32 | 4.33 | 3.90 | 0.43 |
| Cr2O3 | MnO | Fe2O3 | NiO | CuO | ZnO | SrO | ZrO2 | BaO | P2O5 | LOI |
| 0.10 | 0.20 | 1.41 | 0.04 | 0.57 | 0.19 | 0.03 | 0.09 | 0.18 | 0.11 | |

TABLE 10

| | | | | Process water | | | | |
|---|---|---|---|---|---|---|---|---|
| Na | K | Al | S | Si | P | Fe | Ni | Ca |
| 47228 | 16768 | 1789 | 686 | 59 | 6 | 6 | <0.5 | 1 |
| As | Ba | Mn | Co | Cr | Hg | Mg | | |
| <0.5 | <0.5 | <0.5 | <0.5 | <0.5 | <0.002 | <0.5 | | |

100 g of starting material were mixed with 200 g process water (1,789 ppm of Al, 47,228 ppm of Na and 16,768 ppm of K determined by ICP-OES) in test M1; Independently, 20 g of starting material were mixed with 200 ml distilled water with added catalysts (a mixture of 1.06 g pure NaOH and 4.40 g of 85% purity KOH) in test M2. The ratio of Na+K/Al in both cases resulted identical and of value 2.4. The reaction takes place in continuous stirring at room temperature.

Figure 3:
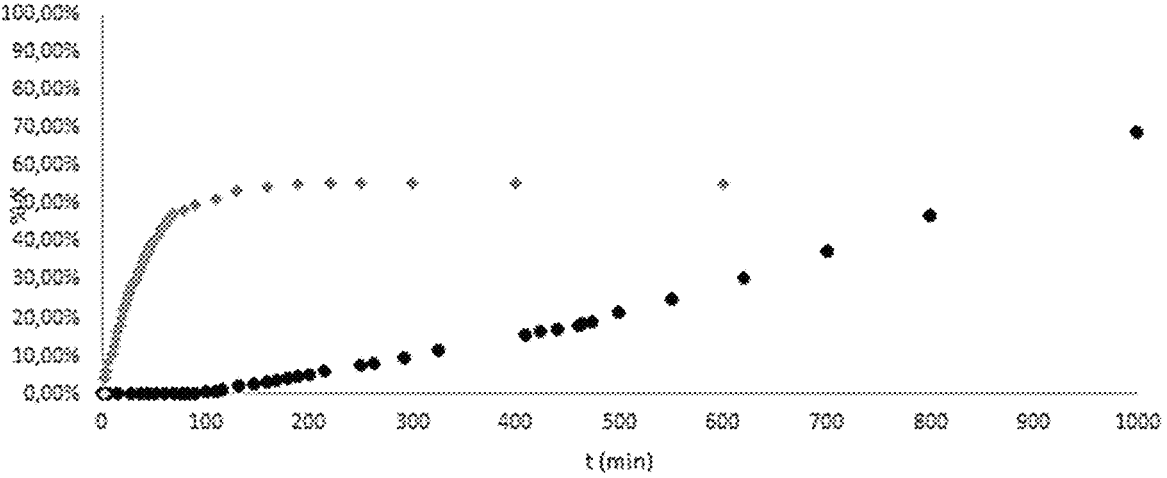
FIG. 3. Shows the variation of the generated gas stream (expressed in conversion percentage) in time of the process water of the present invention with respect to catalyzed distilled tap water (M1 vs. M2) in the hydrolysis of salt slag in Example 2.

The hydrolysis with catalyzed distilled water (M2) started the hydrogen production in few seconds and the gas production flow rate is high, achieving quickly the culmination, but after 100 minutes the reaction finishes, and the hydrogen generation presents a plateau. On the contrary, the hydrolysis of sample M1 with process water requires more than 100 minutes to arise with slow gas production but always increasing, accomplishing higher conversion than catalyzed water after 1000 minutes (FIG. 3).

The hydrolysis of this salt slag with process water without catalyst produces 11.1 l of hydrogen-rich gas stream. The analysis of the composition of the gas resulting from this process is shown in Table 11.

TABLE 11

| Component | Abundance range |
|---|---|
| Hydrogen | 88.6% v/v |
| Methane | 10.3% v/v |
| Ammonia | 7.2% v/v |
| Phosphine | 10 ppm |
| $H_2S$ | 2.6% v/v |
| Total siloxanes | 11.8 mg/Nm$^3$ |
| Total silicon | 4.09 mg/Nm$^3$ |
| PCl | 2,954.1 kCal/Nm$^3$ |

Example 5. Hydrolysis of White Aluminum Dross

The starting material was white aluminium dross comprising 25% metallic aluminium determined by alkaline gas test, 0.1% elemental sodium and 0.1% elemental potassium analyzed by X Ray fluorescence, grinded as explained in Example 1. Tables 12 and 13 show the composition of the salt slag and the water process used in the present Example.

TABLE 12

| | | | White aluminium dross | | | | |
|---|---|---|---|---|---|---|---|
| BaO | CaO | Cl | Cr2O3 | CuO | Fe2O3 | K2O | MgO |
| — | 1.38 | 0.85 | <0.10 | <0.10 | 0.21 | <0.10 | 2.75 |
| MnO | Na2O | SiO2 | SO3 | TiO2 | ZnO | Al | |
| <0.10 | 0.17 | 1.52 | 0.56 | 0.94 | <0.10 | 87.76 | |

TABLE 13

| | | | | Process water | | | | |
|---|---|---|---|---|---|---|---|---|
| Na | K | Al | S | Si | P | Fe | Ni | Ca |
| 47228 | 16768 | 1789 | 686 | 59 | 6 | 6 | <0.5 | 1 |
| As | Ba | Mn | Co | Cr | Hg | Mg | | |
| <0.5 | <0.5 | <0.5 | <0.5 | <0.5 | <0.002 | <0.5 | | |

100 g of starting material were mixed with 200 g process water (1,789 ppm of Al, 47,228 ppm of Na and 16,768 ppm of K determined by ICP-OES) in test M1; Independently, 20 g of starting material were mixed with 200 ml distilled water with added catalysts (a mixture of 1.1 g pure NaOH and 4.6 g of 85% purity KOH) in test M2. The ratio of Na+K/Al in both cases resulted identical and of value 0.5. The reaction takes place in continuous stirring at room temperature.

Figure 4:
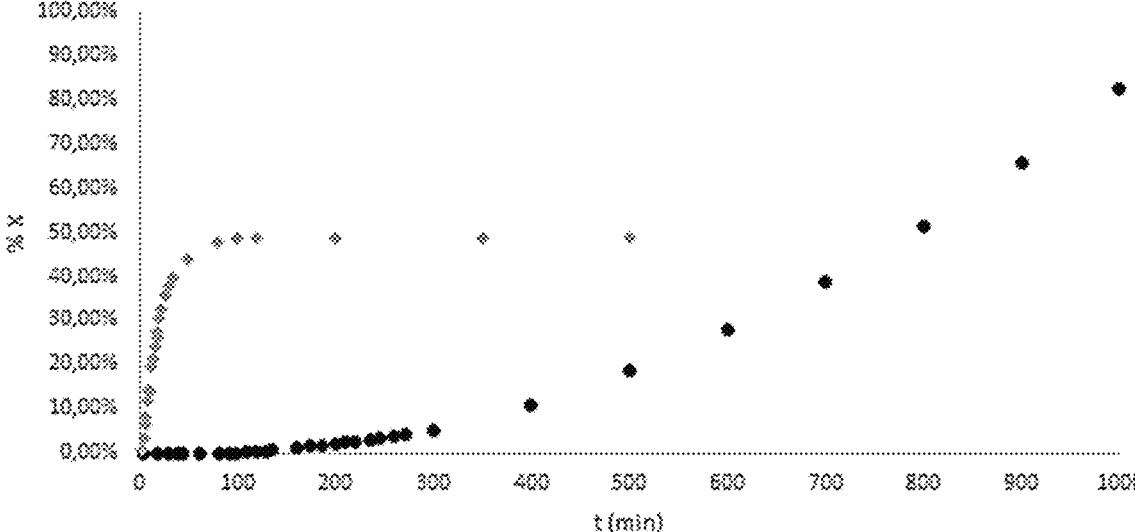
FIG. 4. Shows the variation of the generated gas stream (expressed in conversion percentage) in time of the process water of the present invention with respect to catalyzed distilled tap water (M1 vs. M2) in the hydrolysis of white aluminium dross in Example 3.

The M2 hydrolysis show a very productive formation of the aluminate and hydrogen generation in a short period of time but in 80 minutes reached its maximal and remains stand since then. As for M1, the gas generation continues in the time until higher conversion values (FIG. 4). Thus, the production of a hydrogen-rich gas stream from an aluminium waste consisting of aluminium dross is achieved highly efficient.

The hydrolysis of this white dross with process water produces 27.4 l of hydrogen-rich gas stream. The analysis of the composition of the gas resulting from the process is shown in Table 14.

TABLE 14

| Component | Abundance range |
|---|---|
| Hydrogen | 91.3% v/v |
| Methane | 7.5% v/v |
| Ammonia | 2.1% v/v |
| Phosphine | 9 ppm |
| $H_2S$ | 3.5% v/v |
| Total siloxanes | 5.6 mg/Nm$^3$ |
| Total silicon | 1.9 mg/Nm$^3$ |
| PCl | 2,798.7 kCal/Nm$^3$ |

Example 6. Hydrolysis of Black Aluminium Dross

The starting material was black aluminium dross comprising 26.1% metallic aluminium determined by alkaline gas test, 3.6% elemental sodium and 1.2% elemental potassium analyzed by X Ray fluorescence, grinded as explained in Example 1. Tables 15 and 16 show the composition of the salt slag and the water process used in the present Example.

TABLE 15

| Black aluminium dross | | | | | | | |
|---|---|---|---|---|---|---|---|
| BaO | CaO | Cl | Cr2O3 | CuO | Fe2O3 | K2O | MgO |
| — | 1.37 | 4.71 | <0.10 | 0.85 | 1.09 | 1.49 | 4.33 |
| MnO | Na2O | SiO2 | SO3 | TiO2 | ZnO | P2O5 | Al |
| 0.14 | 4.87 | 8.73 | 0.44 | 0.40 | 0.30 | <0.10 | 65.00 |

TABLE 16

| Process water | | | | | | | | |
|---|---|---|---|---|---|---|---|---|
| Na | K | Al | S | Si | P | Fe | Ni | Ca |
| 47228 | 16768 | 1789 | 686 | 59 | 6 | 6 | <0.5 | 1 |
| As | Ba | Mn | Co | Cr | Hg | Mg | | |
| <0.5 | <0.5 | <0.5 | <0.5 | <0.5 | <0.002 | <0.5 | | |

100 g of starting material were mixed with 200 g process water (1,789 ppm of Al, 47,228 ppm of Na and 16,768 ppm of K determined by ICP-OES) in test M1; Independently, 20 g of starting material were mixed with 200 ml distilled water with added catalysts (a mixture of 1.1 g pure NaOH and 4.6 g of 85% purity KOH) in test M2. The ratio of Na+K/Al in both cases resulted identical and of value 0.7. The reaction takes place in continuous stirring at room temperature.

Figure 5:
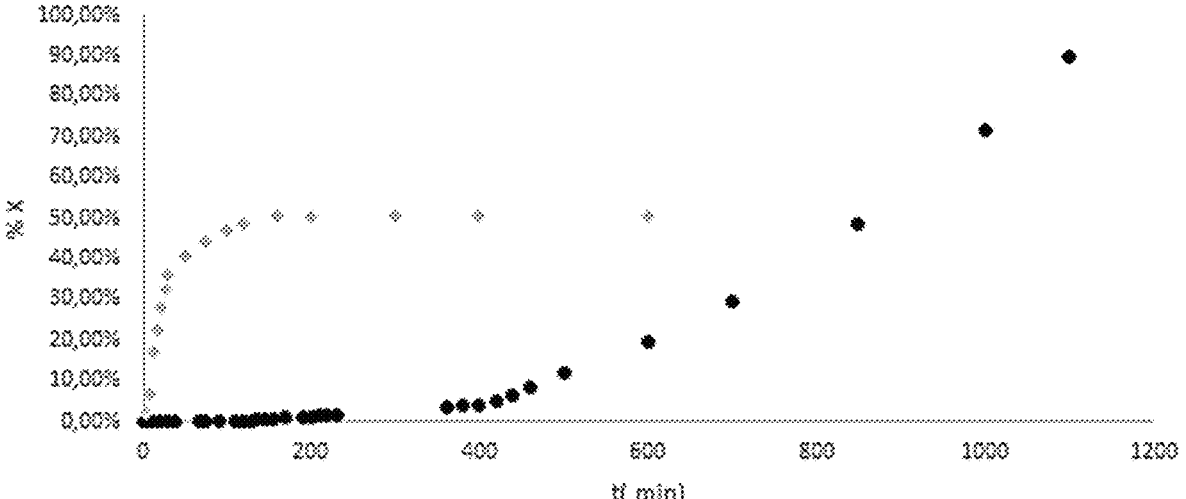
FIG. 5. Shows the variation of the generated gas stream (expressed in conversion percentage) in time of the process water of the present invention with respect to catalyzed

The profile of hydrogen production followed a similar pattern as for the previous examples both for M1 and M2. Remarkable is that the M1 the hydrolysis took almost 200 minutes to start but then progressed with time (1200 minutes) to a final conversion close to 100% (FIG. 5).

The hydrolysis of this black dross with process water produced a 31.3 l of hydrogen-rich gas stream. The analysis of the composition of the gas resulting from this process is shown in Table 17.

TABLE 17

| Component | Abundance range |
|---|---|
| Hydrogen | 87.0% v/v |
| Methane | 8.7% v/v |
| Ammonia | 6.9% v/v |
| Phosphine | 9 ppm |
| $H_2S$ | 0.3% v/v |
| Total siloxanes | 3.8 mg/Nm$^3$ |
| Total silicon | 1.0 mg/Nm$^3$ |
| PCl | 3,035.4 kCal/Nm$^3$ |

The invention claimed is:

1. A process for obtaining a hydrogen-rich gas stream from aluminium waste comprising:
   a) obtaining a process water resulting from contacting aluminium salt slag with tap water in a relation of 1:2 by weight during a time of reaction of 60-120 minutes,
   b) adding the process water from step a) to an aluminium waste consisting of particles of 1 mm size or less, in a solution, and
   c) conducting a hydrolysis of the solution obtained in step b) to obtain the hydrogen-rich gas stream.

2. The process according to claim 1, wherein said process comprises a further step c) of purifying the resulting gas stream.

3. The process according to claim 1, wherein said aluminium waste comprises salt slag.

4. The process according to claim 1, wherein said aluminium waste comprises aluminium dross.

5. The process according to claim 1, wherein step a) is performed at room temperature.

6. The process according to claim 1, wherein said hydrolysis of step c) is performed at room temperature.

7. The process according to claim 1, wherein a catalyst is incorporated in the hydrolysis of step c).

8. The process according to claim 7, wherein said catalyst is NaOH+KOH.

* * * * *